Feb. 2, 1926.  
E. J. EMERY  
BUFFER  
Filed Dec. 8, 1921  
1,571,713
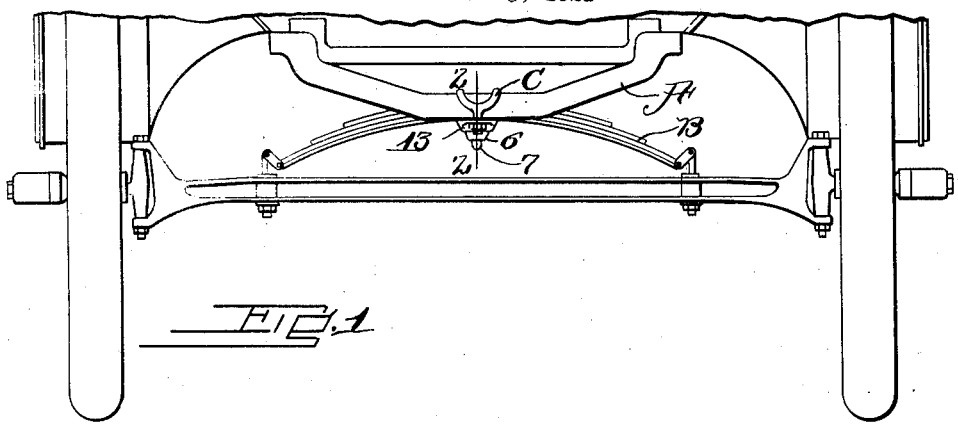
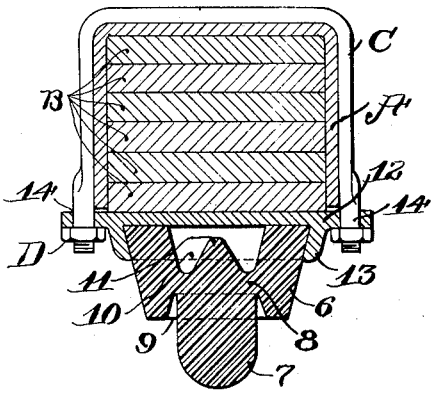
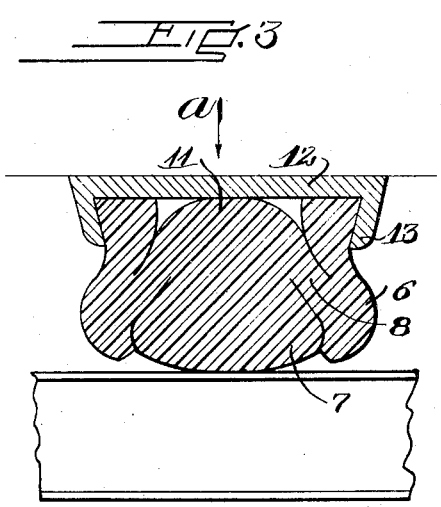
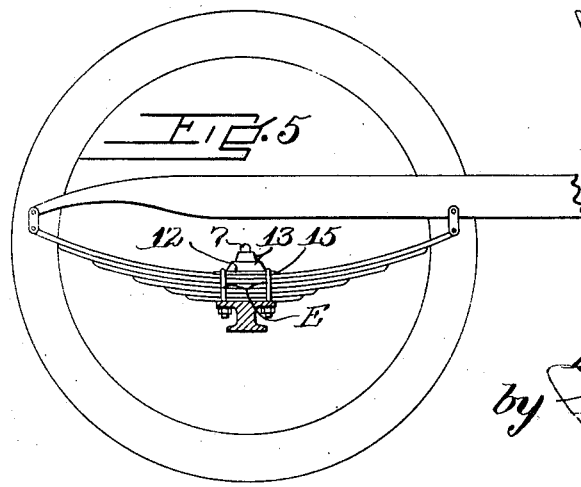
Inventor;  
Elias J. Emery,  
by Roberts, Roberts, Cushman  
his attys.

Patented Feb. 2, 1926.

1,571,713

UNITED STATES PATENT OFFICE.

ELIAS J. EMERY, OF LYNN, MASSACHUSETTS.

BUFFER.

Application filed December 8, 1921. Serial No. 520,888.

*To all whom it may concern:*

Be it known that I, ELIAS J. EMERY, a citizen of the United States of America, and resident of Lynn, in the county of Essex and State of Massachusetts, have invented new and useful Improvements in Buffers, of which the following is a specification.

This invention relates to resilient buffers. Devices for preventing or lessening the shock of collision of parts of machinery have heretofore been provided in many situations, and generally consist of means adapted to interpose a yielding and noiseless buffer between the metal parts brought together during operation. Familiar devices for this purpose are dash-pot pistons, blocks of raw-hide or vulcanized rubber, and pads of leather or felt. The useful life of such structures is undesirably short, and a principal object of this invention is to provide a reliable device for such uses, which shall have a relatively long life, and which shall have an improved function in bringing to rest the moving part.

Particularly, the present invention is concerned with providing a buffer which will begin its action at first contact by deformation under slight pressure, and thereafter continue its action by deformation requiring more and more pressure, until the moving part is brought to rest.

In order to accomplish these purposes, the invention provides a resilient plug, preferably of rubber or a rubber substitute, so designed as to utilize the tensile resilience of a portion of the material of the device in the first instance, and thereafter to utilize the resilience of compression of the material. A subordinate object of the invention is to so design the device as to cause all of the resilient material employed to participate in the padding or resilient protection between the parts.

While there are many uses for the device, I shall, by way of example, describe it in connection with the supporting springs of an automobile, in which it finds a typical use.

In the drawings,

Figure 1 is a front elevation of the running gear of an automobile showing the improved buffer attached to the front spring;

Figure 2 is a section on the line 2—2, Fig. 1;

Figure 3 is an enlarged section of the buffer under compression;

Figure 4 is an enlarged section showing a modification; and

Figure 5 is a side elevation of the front of an automobile showing the buffer used with a different type of spring suspension.

The improved buffer comprises a body 6 moulded from rubber, rubber substitute or rubber compound vulcanized or otherwise solidified to an elastic, tough resilient state. Mounted for independent movement on body 6 and projecting outwardly therefrom is a separately suspended member or plug 7. This plug is integral with the body 6 and not wholly separate therefrom. The connection between plug 7 and body 6 comprises an integral bridge 8, defined by a depression 9 in the outer face of the body 6 and a recess 10 on the inner face thereof. When pressure is applied to the projecting end of plug 7, the adjacent parts of the plug and body 6, including bridge 8, are placed under tensile strain, since the stress under which integral bridge 8 will stretch to yield is less than the strain required substantially to deform and compress plug 7 or body 6. If the pressure is continued and increases. the plug 7 and its supporting body 6 are then subjected to compressive stress. I prefer to arrange for the compressive resilience of the plug to become effective gradually by so forming its inner end as to increase its compressive resilience proportionally to the inward displacement of the movable body. This is effected by pointing, sloping or doming the inner portion of the plug, so as to provide a rounded, frustro-pyramidal, frustro-conical or conical portion (for example, as shown at 11) adapted to bring an increased area of the body to rest against its seat as it is forced further inward. It will be noted that since, as shown in Fig. 2, the extremity of the portion 11 is normally spaced by a certain distance from the plane of the base of the buffer, the plug has a certain limited path of free movement before it engages the member 12.

Recess 10 is closed by a supporting plate 12 upon which the buffer is mounted. One means for retaining the buffer in position comprises an under-cut flange 13 on plate 12 receiving the inner end of body 6. While the under-cut of the flange, combined with the resiliency of body 6 will be sufficient to retain the buffer in place, body 6 may, if desired, be cemented or otherwise fastened in the cup-shaped opening provided therefor by flange 13. Plate 12 may be of any desired shape which will fit it for use in the particular place to which the buffer is to be applied. In Figs. 1 and 2 the buffer is shown applied to the front spring of a popular type of automobile. In this case plate 12 takes the place of the retaining plate which spans channel member A and retains front spring B in proper relation to the forward part of the chassis. Plate 12 with the buffer mounted thereon is retained in position by the U-bolt C, the ends of which extend through openings 14 in the ends of plate 12 and have nuts D thereon.

In Fig. 5 the buffer is shown in use in connection with a different type of spring or spring suspension. In this case plate 12 has outwardly extending ears 15 which may be recessed, if desired, to receive thereover the U-bolts E.

In order to prevent the inner edge of flange 13 from cutting into the relatively soft material of which body 6 is made, which may result from the frequent expansion of body 6 under compression, the latter may have applied thereto a section of protective material 16 fitted in a recess 17 in body 6 opposite the outer end of flange 13, as shown in Fig. 4. The protective material should be flexible in order not to interfere unduly with the action of the buffer under compression, and may comprise textile material in various forms such as heavy tape.

The action of the buffer under compression is illustrated in Fig. 3 in which the direction of thrust is indicated by arrow $a$. As previously described, the initial pressure upon the end of plug 7 forces the latter upwardly placing bridge 8 and the adjacent portions of the buffer under stretching or tensile strain. At the same time some compressive strain is applied to the plug itself and to the base portion of body 6. When projection 11 on the base of plug 7 contacts with plate 12 heavy compressive strain is set up throughout plug 7 producing gradually increasing resistance to the downward movement of the spring. The air pocket in recess 10 likewise adds to the resistance and to the resilience of the buffer. The structure of the buffer is such that all parts thereof are utilized, either through tensile or compressive stress, to resist shock as clearly illustrated in Fig. 3.

I claim:

1. Shock absorbing mechanism comprising a resilient buffer having therein an integral projecting plug of a length greater than the length elsewhere of said buffer, said plug being resiliently supported for movement with respect to the remainder of the buffer, and means for supporting said buffer on an element between which and a second element shock is to be absorbed.

2. In an apparatus of the character described, in combination, means for attaching a buffer to a machine element, and a resilient buffer associated with said means and comprising a body molded of a plastic substance having tensile resilience and having therein a partially separated portion constituting a plug of greater length than the length of said buffer at other points, said plug being movable in a direction to cause approach of its outer extremity to said machine element, and being connected to the body of said buffer by an integral resilient bridge.

3. A resilient buffer comprising a body adapted to interfit with an undercut seat in a machine element and having therein and partially separated therefrom an integral plug of the same substance as the buffer normally projecting beyond the body of the buffer, and a connecting bridge between the body of the buffer and the plug adapted to be stretched under pressure upon the plug and return the plug to its normal projecting position upon cessation of pressure by the tensile resilience of the bridge.

4. A resilient buffer made as a round body having a base adapted to a seat in a machine element, said base having therein a depression partially isolating a part of the substance of the buffer within the margins of the depression, said buffer having a corresponding depression in its outer surface defining a projecting integral plug of the material of the buffer, and adapted thereby to support the plug so formed for resilient deformation within the upper surface of the buffer upon pressure upon the plug, such deformation causing tensile stretching of the integral juncture between the plug and the body of the buffer.

5. A resilient buffer having therein inner and outer depressions partially detaching therefrom a portion of the integral substance of the buffer constituting a plug, said plug being held to project outwardly from the surface of said buffer by the tensile elasticity of a portion of the substance of the buffer joining said plug to the buffer in combination with seating means in contact with said inner surface and a machine element to be cushioned by the buffer.

6. A resilient buffer comprising a body of plastic substance, a depression in the upper surface of said body and a corresponding recess in the lower surface, the two defining a plug normally projecting above said upper surface and connected to said body by an integral bridge, and a projection on the lower part of said plug partially filling said recess in combination with seating means in contact with said inner surface and a machine element to be cushioned by the buffer.

7. A resilient buffer comprising a conical body of plastic substance, a depression in the base surface of said body and a corresponding recess in the apex surface, the two defining a plug normally projecting above said upper surface and connected to said body by an integral bridge, and an integral projection on the lower part of said plug partially filling said recess, whereby on application of pressure to the plug, the latter including said projection is put under compressive strain and adjacent portions of the plug and the body including said bridge under tensile strain.

8. A resilient buffer comprising a body of plastic substance, a depression in the upper surface of said body and a corresponding recess in the lower surface, the two defining a plug normally projecting above said upper surface and connected to said body by an integral bridge, a projection on the lower part of said plug partially filling said recess, and means receiving and supporting said body comprising a cup-shaped member.

9. A resilient buffer comprising a body of plastic substance, a depression in the inner surface of said body and a corresponding recess in the outer surface, the two defining a plug normally projecting beyond said outer surface and connected to said body by an integral bridge, a projection on the inner part of said plug partially filling said recess, and a member having an undercut flange for receiving and supporting the inner part of said body.

10. A resilient buffer comprising a body molded of a plastic substance having an integral projecting plug connected to said body by an integral bridge, a recess in said body into which the inner end of said plug extends, and a plate closing said recess and serving as a support for said body and an abutment for said plug said plate being adapted for attachment to a machine element to be cushioned by the buffer.

11. A resilient buffer having therein an integral projecting plug free to move with respect to the remainder of the buffer, the path of free movement of said plug being shorter than the distance which said plug projects.

12. A resilient buffer having therein an integral projecting plug free to move with respect to the remainder of the buffer, the path of free movement of said plug being less than the distance which said plug projects beyond the remainder of said buffer, and said plug having associated therewith means for increasing the resistance to movement thereof progressively as the outer end of said plug is moved in excess of the length of said path.

13. A resilient buffer having therein an integral projecting plug free to move with respect to the remainder of the buffer, the path of free movement of said plug being less than the distance which said plug projects beyond the remainder of said buffer, and said plug having associated therewith means for increasing the resistance to movement thereof progressively at an increasing rate as the outer end of said plug is moved in excess of the length of said path.

Signed by me at Boston, Massachusetts, this sixth day of December, 1921.

ELIAS J. EMERY.